INVENTORS.
WILLIAM STUTZ
CHARLES N. PREMO

BY Kenwood Ross

ATTORNEY.

Dec. 8, 1964   W. STUTZ ETAL   3,159,875
AUTOMATIC MOLDING PRESS

Filed June 30, 1961

INVENTORS.
WILLIAM STUTZ
CHARLES N. PREMO

BY Kenwood Ross

ATTORNEY.

INVENTORS.
WILLIAM STUTZ
CHARLES N. PREMO

BY Kenwood Ross

ATTORNEY.

Dec. 8, 1964

W. STUTZ ETAL 3,159,875

AUTOMATIC MOLDING PRESS

Filed June 30, 1961

INVENTORS.
WILLIAM STUTZ
CHARLES N. PREMO
BY Kenwood Ross
ATTORNEY.

Dec. 8, 1964   W. STUTZ ETAL   3,159,875
AUTOMATIC MOLDING PRESS
Filed June 30, 1961   10 Sheets-Sheet 8
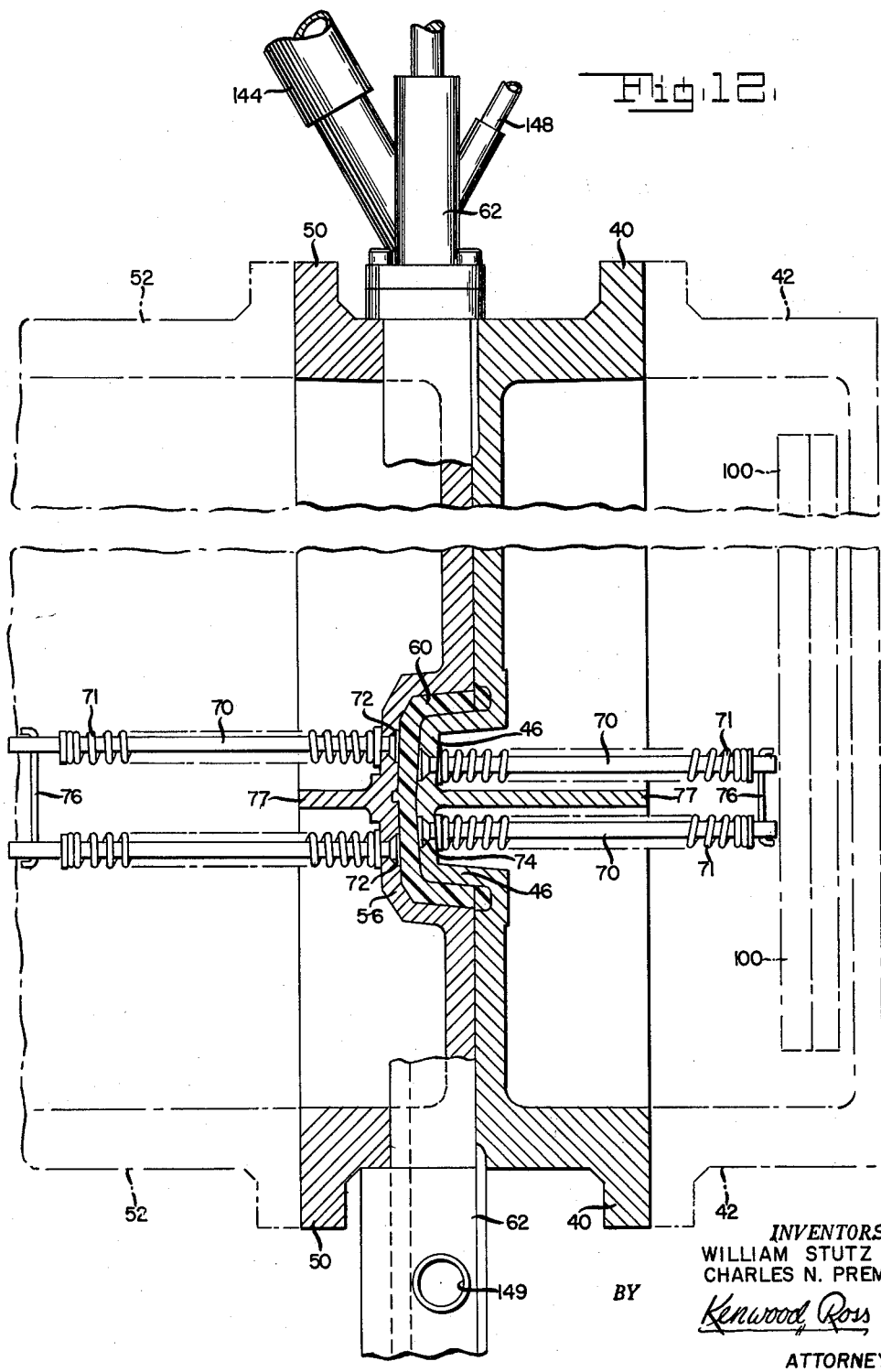
INVENTORS.
WILLIAM STUTZ
CHARLES N. PREMO
BY Kenwood Ross
ATTORNEY.

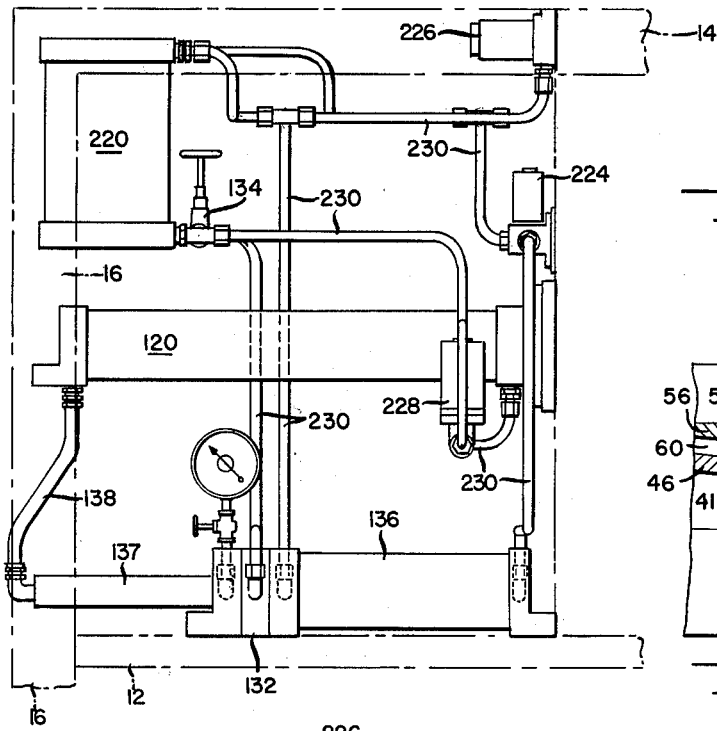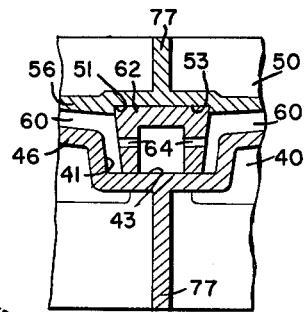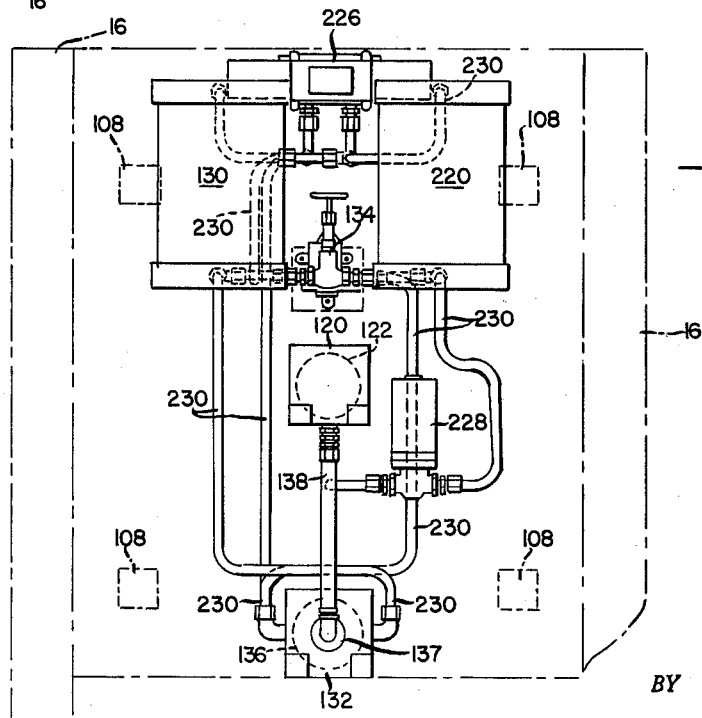

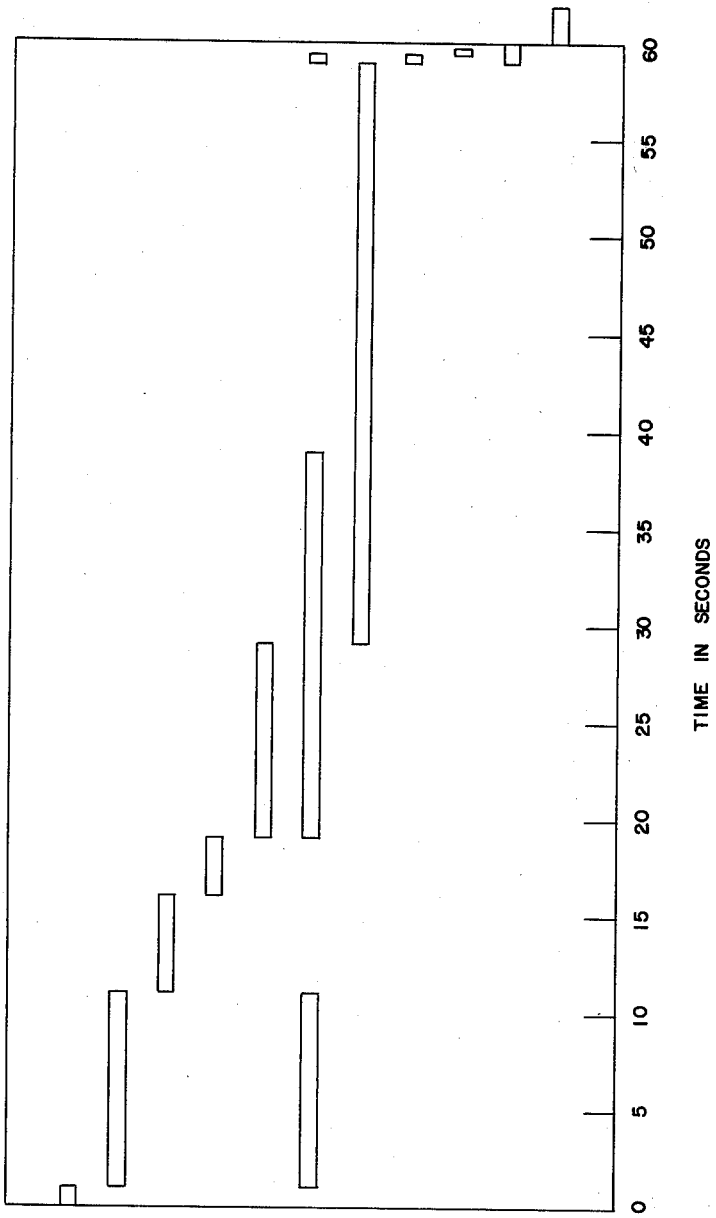

3,159,875
AUTOMATIC MOLDING PRESS
William Stutz and Charles N. Premo, Springfield, Mass., assignors to Springfield Cast Products, Inc., Springfield, Mass.
Filed June 30, 1961, Ser. No. 120,982
1 Claim. (Cl. 18—5)

Our invention relates to new and useful improvements and structural refinements in apparatus for, and in procedural refinements in a method of, forming molded lightweight, thermal-insulating, cellular articles from a thermoplastic resin of the expandable or foaming-in-place type.

The invention resides in the particular arrangement, construction, and relationship of the various components and instrumentalities of the molding apparatus, and in a method or process involving a relation and order of a plurality of sequential steps, all as exemplified in the detailed disclosure hereinafter set forth, wherein the objects of the invention, as defined in the paragraphs below, will be apparent.

The invention broadly contemplates improvements in the working in situ of a solid resinous polymer or copolymer of a monovinyl aromatic compound, particularly styrene. For convenience, such polymers and copolymers are referred to as "vinyl aromatic resins" and their cellular products are termed "foams."

Beads or grains or granules or pellets of expandable or foaming-in-place polystyrene are envisioned for use herein and include the commercially available types such as may be purchased from Monsanto Chemical Company, The Koppers Company, Dow Chemical Company, and others and comprehend the type which are initially expanded into a porous state by an expanding or blowing agent and subsequently agglutinated by the influence of heat.

As is known, the foaming or charging agent employed therewith is normally methylchloride, butane, heptane, or the like, same being normally impregnated into the beads by the supplier.

The beads are normally prefoamed before molding as by bringing same to an intermediate temperature below their maximum foaming temperature (for example, on the order of 190° F. as a prefoam temperature, when they have a maximum foaming temperature of from 230° to 240° F.) so that they swell up to an intermediate size wherefor they can be more easily handled.

When disposed within the cavity of a mold, the application of heat transforms the thermoplastic beads containing the blowing agent into a strong, light, resinous, shaped foam having a discrete closed-cell structure, said heat softening the beads with an evolution and release of the gas therewithin so as to accomplish their expansion wherefor they fuse to and coalesce with each other to form a unicellular or closed-cell resinous structure of a shape as determined by the configuration of the mold cavity, the amount of material charged, and the extent and degree of the charging operation.

Closed-cell gas-expanded polystyrene has found wide commercial acceptance because of its unique combination of desirable properties, it being resilient, waterproof, possessive of good sound and heat insulating value, extremely light in weight, and structurally strong, all so as to make it applicable for a myriad number of purposes. To name a few, it may be used as a vibration-damping material, as a stuffing material, as a flooring and walling material, as a packaging material, as an insulation medium against heat and/or cold and/or sound, as an interstitial layer material disposable between spaced plates, as a sealing material for miscellaneous uses, and as a floatation material for use in boats, life-belts and the like.

The invention hereof envisions a system of, and means for, working the material in situ from its beadlike state to its finished form as a cellular mass of resinous foam in manner wherein the beads are advanced under pressure from a source of supply through sprue passages to a closed molding cavity of a mold or press comprised of partible sections, in which cavity the beads are allowed to expand into an article of definite shape, following which cooling ensues and the mold sections are separated for the ejection of the foamed article.

Shaped plastic articles have been heretofore formed in various shapes by molding liquid resins or resin powders under heat and pressure. Because of the necessity of applying pressure, the molding equipment heretofore used has been extremely costly. Too, the use of high pressures has frequently necessitated high pressures pumps and gasing autoclaves of tremendous strength, the maintenance of which has usually been exceedingly expensive. Further, the problem of cooling the foamed material has required costly solutions, the formed articles having to be retained within the molds and pressure apparatus until completely cooled, thereby increasing down-time and seriously aggravating operating costs and production rates. The variety of end products formed from such prior art methods has been accordingly somewhat limited and universal acceptance of such has been considerably retarded because of the competition of inferior and far cheaper substitutes.

It is a primary object of the present invention to provide a pair of cooperating and partible mold members which are carried by a fixed head platen and a movable head platen of a power-operated press, each of which mold members includes a mold face detachably securable to a steam chest with the plastic beads being injectible into the die cavity formed by the mating mold faces of the mold members.

Another salient object of the invention is to provide a mold press in which the pressure producing mechanism and the movable and stationary head platens are desirably located to offer advantages of compactness and space economy and easy accessibility for the ready mounting and dismounting of the respective mold faces.

It is another object hereof to provide a means for controlling the pressure buildup within desired limits and for precluding unwanted separation of the mold elements at their parting line and the resulting flashing of the material thereat.

As another feature hereof, aligned sprue channels are provided in each mold face for the reciprocation therewithin of a runner which communicates with and is fed by a supply conduit leading from the supply hopper, said runner being emptied of any excess molding material following completion of the cavity charging and before the heating operation so as to preclude the formation of any solidified sprue therewithin. The gating means breaks communication between the runner and the cavity in manner to preclude any disfigurement of the molded article due to poor gating.

As a further refinement, we provide novel means for cooling the formed articles combined with means for ejecting same from their respective molds including ejector pins suitably shaped so as to prevent any unwanted adhesion of the molded articles thereto.

Additionally, improvements in a means for measuring and feeding or transferring the raw material from the supply to the mold elements in the carrying out of the molding operation are envisioned, it being known that in the formation of articles from moldable resins, the raw material is in comminuted or granular form and that in conveying such to the molding die, difficulties have heretofore been encountered in the metering and conveying of same to the molding apparatus. It may be mentioned that one of the factors contributing to the difficulties has been the imperativeness that the molding machine operate at a comparatively high speed so as to mold a large number of molded items in a minimum of time, all in order to obtain commercially practicable and economic production. To this end, the present invention provides means for the rapid transfer of predetermined quantities from the supply source to the molding means in synchronism with the movements of the molding machine ram and other instrumentalities in manner whereby the desired high production rate is more positively attained than has been heretofore possible.

It is a concurrent object to provide a machine of the character referred to in which electrically-controlled fluid-actuated and air-actuated systems initiate and control the various sequential steps of the molding operation in a desired timed relation offering improved efficient molding procedures and uniformly molded products.

In each operation cycle, the partible elements of the mold are first closed, optionally a pre-steaming of the mold to a preset pressure may be effected, the mold is charged by a feeder, the mold feed runner is emptied by a blowout procedure, a steaming of the mold to a preset pressure is effected, a cooling of the formed article ensues, the mold is opened from pressure position for article ejection of the formed article, and the movable mold element is actuated in retrograde movement preparatory to recycling. The time period or interval for each step in the automatic cycle may be selectively adjusted, according to that determined to be necessary, as controlled by various conditions and requirements including the characteristics of the molding material, the volume thereof, the end product desired, and such other variables as may exist.

Other of the chief objects and purposes hereof are to provide an apparatus having advantageous structural and operational features and meritorious characteristics as follows: first, a simplicity in construction and therefore an adaptability to economical manufacture; second, a uniqueness in engineering design of coacting parts with the components being coordinated for facile assembly; third, an ease of installation for a variety of purposes and/or conditions; fourth, a high degree of efficiency and dependability in operational use; fifth, the securement of a higher degree of accuracy and greater degree of variety in the manner of work performed therewith than has heretofore been possible with any known prior art device; sixth, the achievement of a greater ease in repairs and consequent reduction in maintenance costs than has been possible in related heretofore known devices; and seventh, the provision of such other improvements in and relating to presses and methods of the type above referred to as are hereinafter described and claimed.

Further objects hereof are to provide a press comformable to the desiderata of the preceding paragraph and offering specific improvements in the various operating instrumentalities comprising same, which offers the advantages of distinctiveness in appearance, practicalness in value, durability in organization, and reliableness in operation.

With these and other reasonably appearing objects and advantages in view, some of which will be in part obvious and apparent and some of which will be in part more fully pointed out hereinafter, it is to be explained that the physical embodiment herein shown is indicative of one of the various ways, albeit the preferred exemplification, in which the principles of the invention may be employed.

The invention is not restricted to said embodiment and same is not intended to be exhaustive of, nor limiting of, the spirit hereof. The precise construction of the figures of the drawings need not be slavishly followed as, of course, various components may have to be adapted or modified in accordance with a specific use to which the apparatus may be put.

Too, while we have illustrated a preferred form of our invention as utilized for measuring and transferring resinous or plastic materials to a molding die and for curing same, it is to be understood that we contemplate the utilization of its principles for transferring and treating materials of all kinds wherein an embodiment of our invention may be found to have utility.

All of the objects hereof are susceptible of attainment by use of constructions, different in certain respects from that disclosed, all without departing from the underlying principles, scope and spirit of the invention, so it is premised that such adaptations and/or modifications should be and are intended to be comprehended within the meaning and range of equivalence of the below subjoined claims.

The novel features which we consider to be characteristic of our invention, as to its construction and organization and as to its method of operation, will be best understood from a consideration of the following detailed description and annexed drawings.

Figure 10:
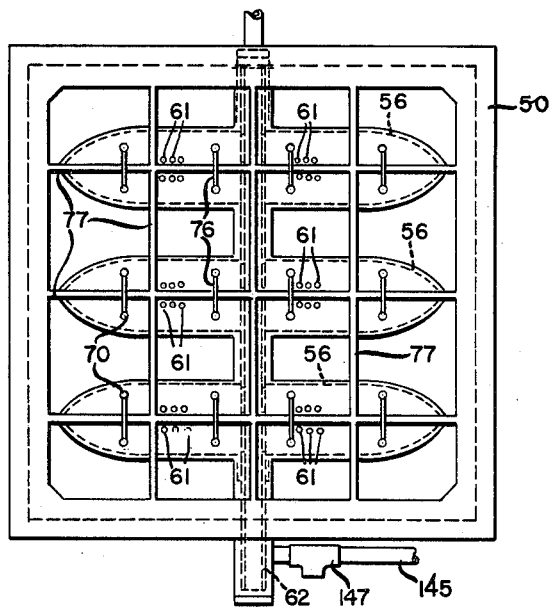
FIG. 10 is a rear elevational view of the mold face of the stationary head platen.
Figure 11:
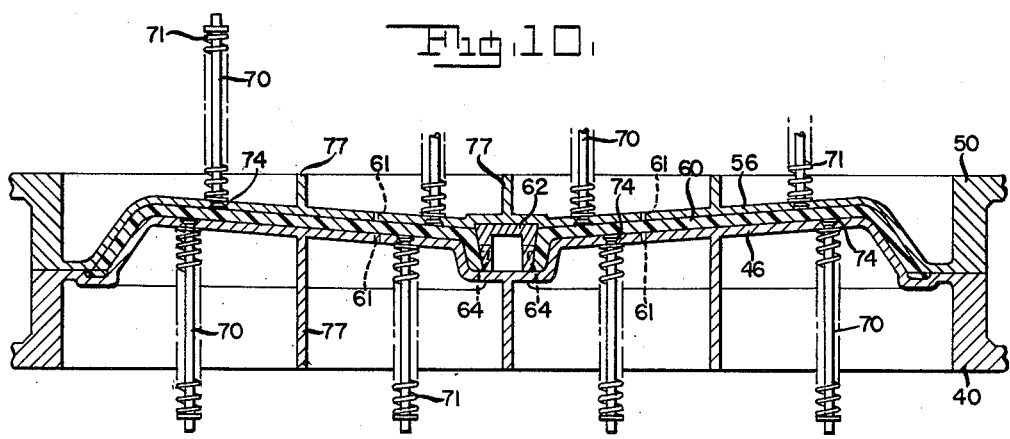
Figure 10A:
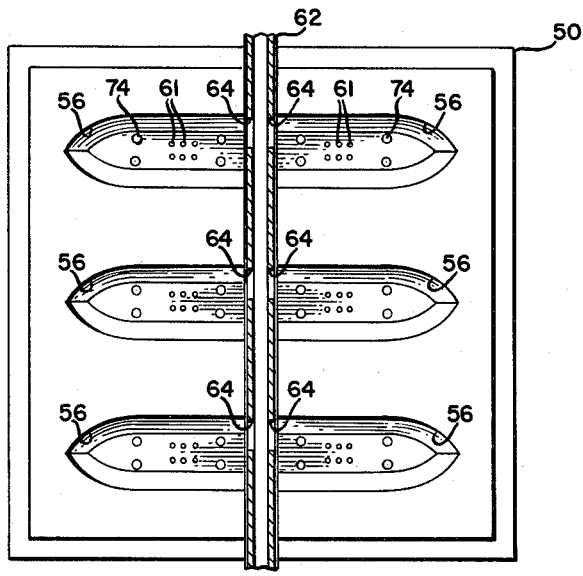
FIG. 10A is a front elevational view of the mold face of the stationary head platen.
Figure 10B:
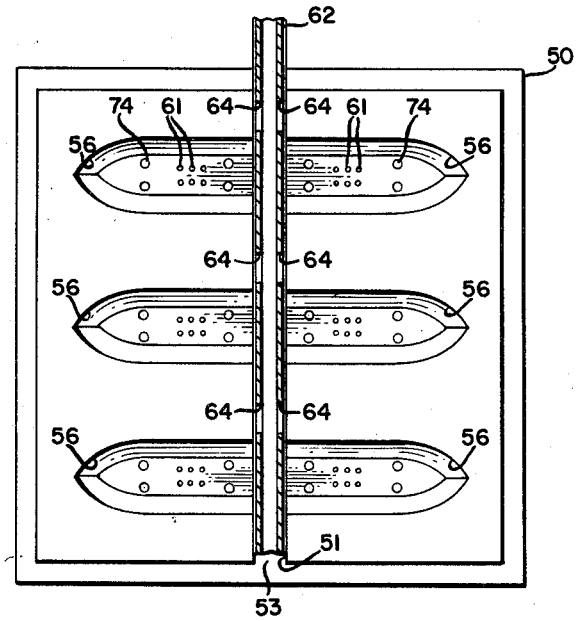

ment within the runner opening in cavity-charging position;

FIG. 10B is a front elevational view, similar to FIG. 10A, showing the runner element within the runner opening in cavity-closed position;

FIG. 11 is an enlarged transverse sectional view taken through the complemental mold faces of the stationary and movable head platens;

FIG. 11A is an enlarged fragmentary view taken through the complemental mold faces of the stationary and movable head platens, as shown in FIG. 11, showing the relationship of runner opening, runner element and cavities;

FIG. 12 is an enlarged, broken, longitudinal sectional view taken through the complemental male and female mold faces;

FIGS. 13 and 14 are somewhat diagrammatic side and end elevational views respectively of the hydraulic piping assembly; and FIG. 15 is a timing diagram showing the operational sequence of steps in the process of the invention.

Figure 1:
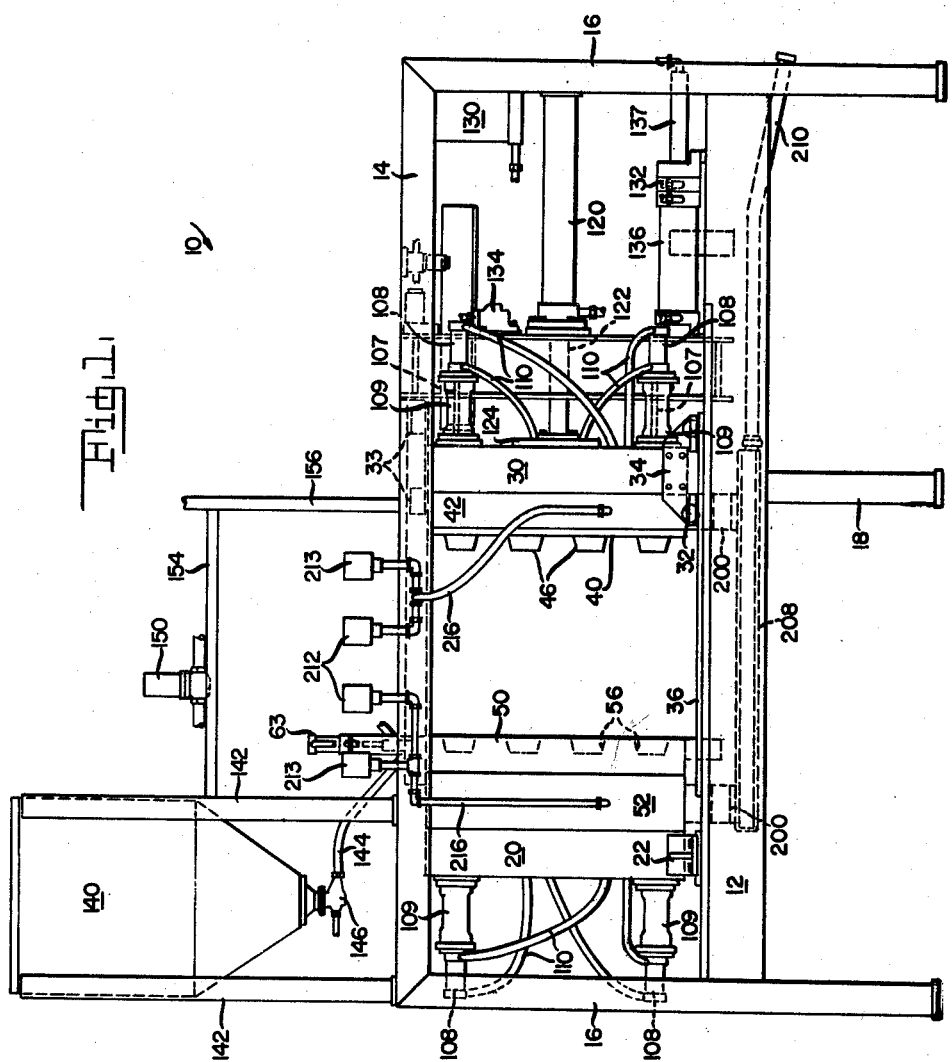
FIG. 1 is a side elevational view of the apparatus embodying the invention.

With continued reference now to the drawings in detail, and first with respect to FIG. 1, we have shown a mold press, generally indicated by 10, to which the teachings of the invention may be particularly advantageously applied.

The mold press will be understood to be fluid-operated, the controlling devices therefor being electrically-operated, all as will hereinafter appear.

The frame of the mold press 10 is inclusive primarily of pairs of lower and upper horizontally-extending supporting rails 12, 12 and 14, 14, respectively. The lower rails 12, 12 are spaced from each other in parallelism in one horizontal plane and the upper rails 14, 14 are spaced from each other in parallelism in another horizontal plane spaced thereabove, each said upper rail 14 being in vertical alignment with one of the lower rails 12. Said rails are connected to each other by the usual end rails 15 and are spaced upwardly from a floor or base upon which the apparatus is disposed by means of vertically-disposed side guides or braces 16 at opposite ends of said rails. Other vertically-disposed intermediate braces 18 may be fixed in supporting position relative to each of the lower rails 12, 12 as shown.

The frame supports a stationary head platen 20 and a movable head platen 30, which platens are disposed in spaced vertical planes within the area defined by said rails, said stationary head platen 20 being rigidly bolstered to lower and upper rails 12, 12 and 14, 14 respectively as by brackets 22, weldments or equivalent means, and said movable head platen 30 being reciprocable relative to said lower and upper rails by means of rollers 32 journalled in side plates 34 fixed to each side of said movable head platen and rollable along a respective guideway 36 secured to the top planar surface of each lower rail 12. Said head platen 30 is additionally supported relative to each upper rail 14 as by rollers 33 which are rollable therealong in manner to guide the movable head platen in its horizontal forward (pressing) and retrograde (opening) movements and further to minimize any tendency to vibrate or to shift sidewise relative to the frame and to be operatively held against any accidental derangement.

Said stationary and movable head platens are generally similar in their configuration, each being preferably rectangular or square, but not obligatorily so.

Stationary head platen 20 carries, on its inwardly-facing end, a removable, vertically-disposed, outermost mold face or die component 50 which serves as the male (or female) portion of the die, which mold face complements an oppositely-facing removable mold face or die component 40 of the movable head platen 30, and a vertically-disposed intermediate steam chest 52, the mold face 50 being releasably secured to the steam chest 52, in manner to be referred to, and the steam chest, in turn, being removably secured to said stationary head platen as by bolts 45 or equivalent means.

Movable head platen 30 carries, on its inwardly-facing end, the removable, vertically-disposed, outermost mold face or die component 40 which serves as the female (or male) portion of the die, and a vertically-disposed, intermediate steam chest 42, the mold face 40 being releasably secured to the steam chest 42, and the steam chest, in turn, being removably secured to said movable head platen as by bolts 45 or the like.

Figure 6:
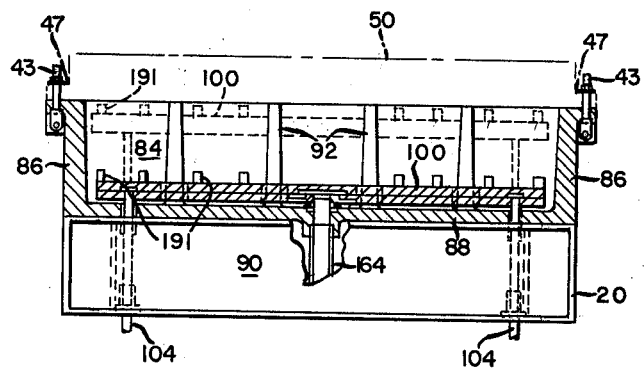
FIG. 6 is a top plan view of certain of the components shown in FIG. 4, with certain parts shown in section or broken away for purposes of clarity.

The side walls of each of the steam chests 42 and 52 are provided with appropriate swivel clamp means 43, as illustrated in FIG. 6, for reception in correspondingly located slots in bosses 47 on the sides of the respective mold faces for the well known clamping function, facilitating the securement of a mold face to its respective steam chest, all as is conventional and well known.

Suitable gasket means, not shown, may be provided between a mold face and its respective steam chest for the obvious preclusion of any escape of steam or water therebetween.

The so-called die member of the apparatus is formed by juxtaposing the oppositely-facing, forwardmost working portions of the mold faces 40 and 50 into confronting or closed relationship with each other, each working portion being provided with a suitable depression or depressions 56 in the case of the female component which is complementary to a projection or projections 46 in the case of the male component in manner to define therebetween a cavity or cavities 60 of predetermined shape and dimension, said cavity or cavities being shaped to the desired configuration of the article or articles to be molded or formed therein.

Versatility is offered in that said mold faces are removable from their respective steam chests, as aforesaid, wherefor the mold faces of a given design may be readily replaced by mold faces of other designs, thus enabling articles of different configurations to be molded with the same mold press.

Each mold face is provided with a plurality of minute steam apertures, such as 61, as shown in FIG. 11, extending transversely therethrough and communicating between the steam chest adjacent the rearward wall of the mold face and the formed cavity or cavities when the mold faces are in confronting relationship so as to allow steam from the steam chest to be passed into the cavity or cavities during the steaming function.

The mold faces 40 and 50 are also provided on their adjacent, forwardmost, oppositely-facing working portions with complemental, vertically-disposed, centrally-located, rearwardly-projecting recesses 41 and 51 respectively, as shown in FIG. 11A, which extend from the tops to the bottoms of said mold faces so as to provide, when the mold faces are in confronting relation, a runner opening through the two-part die element.

Within one of the said recesses forming the runner opening, a generally channel-shaped runner element 62 is held in sliding relationship therewith so that, when the mold faces are brought into confronting relation, said runner element engages the opposite walls of the recesses, wall 43 of recess 41 of mold face 40 and wall 53 of recess 51 of mold face 50, to close off the said runner opening from the cavity or cavities.

The runner element serves as a gating means, it being provided with a plurality of spaced, transversely-extending discharge openings 64 along its length and on either side thereof in manner to offer communication therethrough from within the runner element to each said cavity, when the runner is in a charge position, as shown in FIG. 10A and to preclude communication therebetween when the runner element is elevated or lowered to a no-charge position, as shown in FIG. 10B, whereby the openings 64 are moved out of registry with their respective cavities.

Stated otherwise, the discharge openings 64 in the runner element are each alignable with one of the cavities by appropriate vertical reciprocation of the runner element into a charge position, allowing charging of the cavities, and are movable out of registry with the cavities by other vertical reciprocation of the runner into its opposite no-charge position, precluding further charging of the cavities, once filled, and allowing the blowing out of all excess article-forming material from the runner element before the steaming operation ensues.

In the blowing out sequence, excess material is blown from the runner element to a flexible tube 145 leading from the lower end of said runner element back to the supply hopper subsequently to be described. A moisture trap 147 may be provided in the line 145 as shown in FIG. 10, if desired.

With particular reference to FIG. 12, it will be observed that each mold face 40 and 50 is additionally provided with a plurality of transversely-extending ejector openings 72, through the respective projections 46 and depressions 56, through which ejector openings spring-loaded article ejector pins 70 are extendable. Each said pin 70 carries at its forwardmost extremity an enlarged ejector pin head 74 which is so machined as to offer an outermost configuration which is complemental to the configuration of its respective ejector opening 72 so that, when the ejector pins 70 are in non-working position, the outermost faces of the ejector pin heads 74 are flush with and in the plane of the contour of the wall of the respective projection 46 or depression 56 so as to insure against any unevenness or break in the cavity surface during the article forming sequence.

Each of the ejector pins 70 is interconnected with at least one other such pin by means of an interconnect wire 76 which is engageable with each said pin by being extended through a suitable opening in the shank thereof or by other appropriate means, all for the purpose of holding each of the ejector pins in correct relationship as to the respective working face and as to each other so as to preclude the unwanted rotation of the ejector pins and to insure the maintenance of the aforesaid flush relationship between the ejector pin heads and the wall of the respective projection 46 or depression 56 when the ejector pins are in their normal retracted or withdrawn position.

As aforestated, each ejector pin 70 is spring-loaded by means of an ejector pin spring 71 sleeved therearound and bearing at its forward extremity against the adjacent wall of the projection or depression, as the case may be, and being secured at its rearward extremity to the shank of the respective ejector pin 70 by any conventional means.

As will be subsequently observed, each ejector pin is actuatable into ejecting position when it is extended into its respective cavity to permit the ejection of the molded part therefrom upon separation of the mold faces.

As shown in FIGS. 10 and 11, reinforcement means for the mold faces 40 and 50 may comprise transversely-disposed vertically and horizontally-extending reinforcement ribs or webs 77 which may project rearwardly from the rearward side of the forward vertically-disposed wall thereof and terminate in a vertical plane coincident with the vertical plane of the rear edges of the top and bottom and side walls of the respective said mold face.

Figure 4:
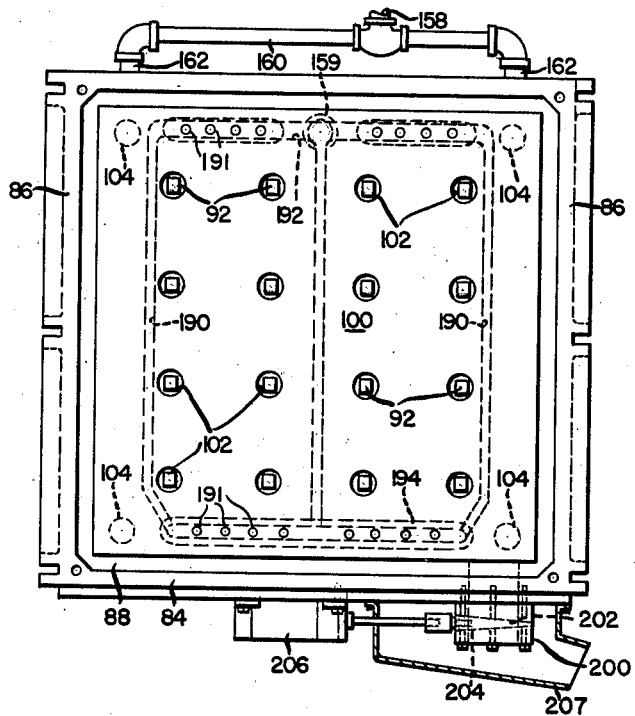
FIG. 4 is a front elevational view of one of the steam chests of the invention showing the movable ejector and spray plate associated therewith.
Figure 5:
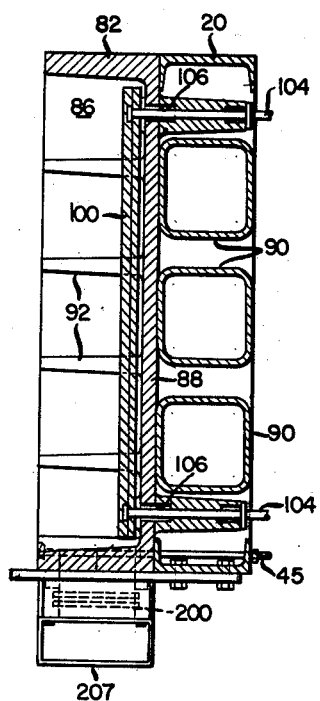
FIG. 5 is an end elevational view of certain of the components shown in FIG. 4, with certain portions being shown in section for purposes of clarity.

With reference now to FIGS. 4–6, the steam chest of each said head platen comprehends a housing comprised of a top wall 82, a bottom wall 84, and a pair of spaced side walls 86, all forming a generally rectangular frame-like configuration and all interconnected as by a vertically-disposed web wall 88 at the rearward end of said housing, and from the forward face of which web wall, a plurality of spaced, forwardly-projecting bosses 92 extend.

Forwardly of said web wall 88, and coplanar therewith, a movable, double-walled ejector and spray plate 100 is provided, same being of dimensions to allow its being nested within and movable relative to the steam chest housing. In FIG. 6, plate 100 in its forwardly-extending spraying and ejecting position is shown in dash lines.

A plurality of spaced boss openings 102 are provided through said ejector and spray plate 100 to allow receipt therethrough of the registerable bosses 92.

It will here be explained that the bosses 92 are so spaced as to permit the forwardmost extremity of each to be alignable with and to bear against one of the reinforcement ribs 77 of its respective mold face, obviously to restrict and guide the forward and rearward movements of said ejector and spray plate 100 within its steam chest housing.

A plurality of spaced, rearwardly-extending ejector and spray plate pins 104 are fixed to the rearwardly-facing wall of said ejector and spray plate, are extendable through complemental openings 106 through the steam chest web wall 88, and are of such length as to extend, when said ejector and spray plate is in its normal retracted position, as in FIG. 5, beyond a vertical plane defined by the rearwardly-facing walls of a plurality of spaced steam tanks 90 secured in spaced relation to the steam chest web wall 88.

Again with reference to FIG. 1, it will be noted that to the end of each said pin 104 is connected the free outer extremity of a respective ejector plate piston 107 which is reciprocably mounted within an associated ejector plate cylinder 108. Each said cylinder is secured to the rearmost wall of its respective head platen 20 or 30 as by a support 109 of conventional design.

Each said piston 107 is reciprocated by means such as compressed air conveyed to its cylinder 108 by a pair of pneumatic lines 110 connected to the tanks 90 so that when acting in unison, the forward and rearward shifting movement of each said ejector and spray plate 100 relative to its respective head platen is effectuated.

During the article ejection step of the process hereof, as the movable head platen commences separation from the stationary head platen, each said ejector and spray plate 100 is urged to a forwardmost ejecting position within its respective steam chest housing and toward its respective mold face through the positive action of the actuated pistons 107, all so as to cause to be projected forwardly in unison the respective ejector pins 70 whereby the same are extended forwardly into their respective cavity or cavities thereby effectively to knock out the molded article or articles from therewithin.

It will be appreciated that such movement of the ejector and spray plates is timed to occur only after the separation of the mold faces. Such positive ejection function, of course, occurs only in the event that the molded part has not by such time fallen from within its cavity through its own weight.

As said ejector and spray plate 100 is withdrawn away from said ejector pins 70, the spring-loaded ejector pins are returned automatically to their retracted positions with their respective ejector pin heads 74 being flush with the mold wall of the cavity which they serve, as aforementioned, all so as to insure against any molded part being left impinged upon or astraddle one of its ejector pins, it being obvious that as said ejector pins are withdrawn to their flush positions, knock off is assured.

The molded pieces thus removed fall into a suitable receptacle or chute therebelow (not shown) for delivery to a desired point.

The mold element positioning means for opening the mold press and for effecting the clamping pressure between the head platens in the closed position will now be described.

Broadly speaking, by appropriate regulation of hydraulic pressure through suitable supply conduits, the movable head platen 30 is actuated by a fluid-pressure responsive piston for axial longitudinal movement forwardly toward (in a pressure direction) and rearwardly away from (in a retrograde direction) the stationary head platen 20, all so as to close or open respectively the cooperating mold faces of the die.

As best seen in FIG. 1, the mold positioning means comprises a hydraulic power unit including a main power ram 120 which is fixed to the frame as by any suitable means and which has a piston 122 reciprocably mounted within the cylinder thereof.

The movable head platen 30 is actuated by means of the piston 122, the forward extremity of said piston and the rearward wall of said movable head platen being secured to each other through a coupling means 124 of any conventional type.

Housed within the frame of the mold press 10 is an appropriate hydraulic air-oil supply tank 130 for supplying a predetermined relatively low pressure through suitable conduits to the main power ram 120 until the head platens assume a partially closed posiiton as to each other. After the cavity or cavities are charged, a hydraulic booster 132, also mounted on the frame, and controlled by a sequence valve 134, functions to apply a relatively high pressure to said ram for holding the mold elements completely closed during the material expansion step.

Said booster 132 comprises a large air cylinder 136 which operates a relatively small diameter piston of a hydraulic ram 137. When actuated by the sequence valve 134, which serves to open an air line 138, (see FIG. 14), into the air cylinder of the booster which in turn rams the piston of the hydraulic ram home, the high pressure required to hold the molds together is produced. Same being of conventional design, it does not seem to require further amplification.

The air-oil booster system utilizes, in addition to the supply tank 130 and hydraulic booster 132, a return tank 220 having a work cylinder 222, solenoid valves 224 and 226, and a positive stop valve 228 associated therewith, all being interconnected by air lines 230.

A supply hopper or receptacle 140 adapted to contain a supply of comminuated plastic or resin is supported upwardly of the frame as by vertical brackets 142 and is provided with a connecting means comprising a pair of flexible tubes 144, each connected at one end to a venturi 146 of well known type fixed to and communicating with a discharge opening in the lower extremity of said hopper and connected at their opposite ends to one of the mold members, as will appear.

A screened aperture 141 may be provided in the hopper 140 if desired whereby the supply level within said hopper may be readily ascertained.

The prefoamed beads are transferred from hopper 140 through each venturi 146 and through the tubes 144 to the runner element 62 and thence to the cavity or cavities.

Figure 2:
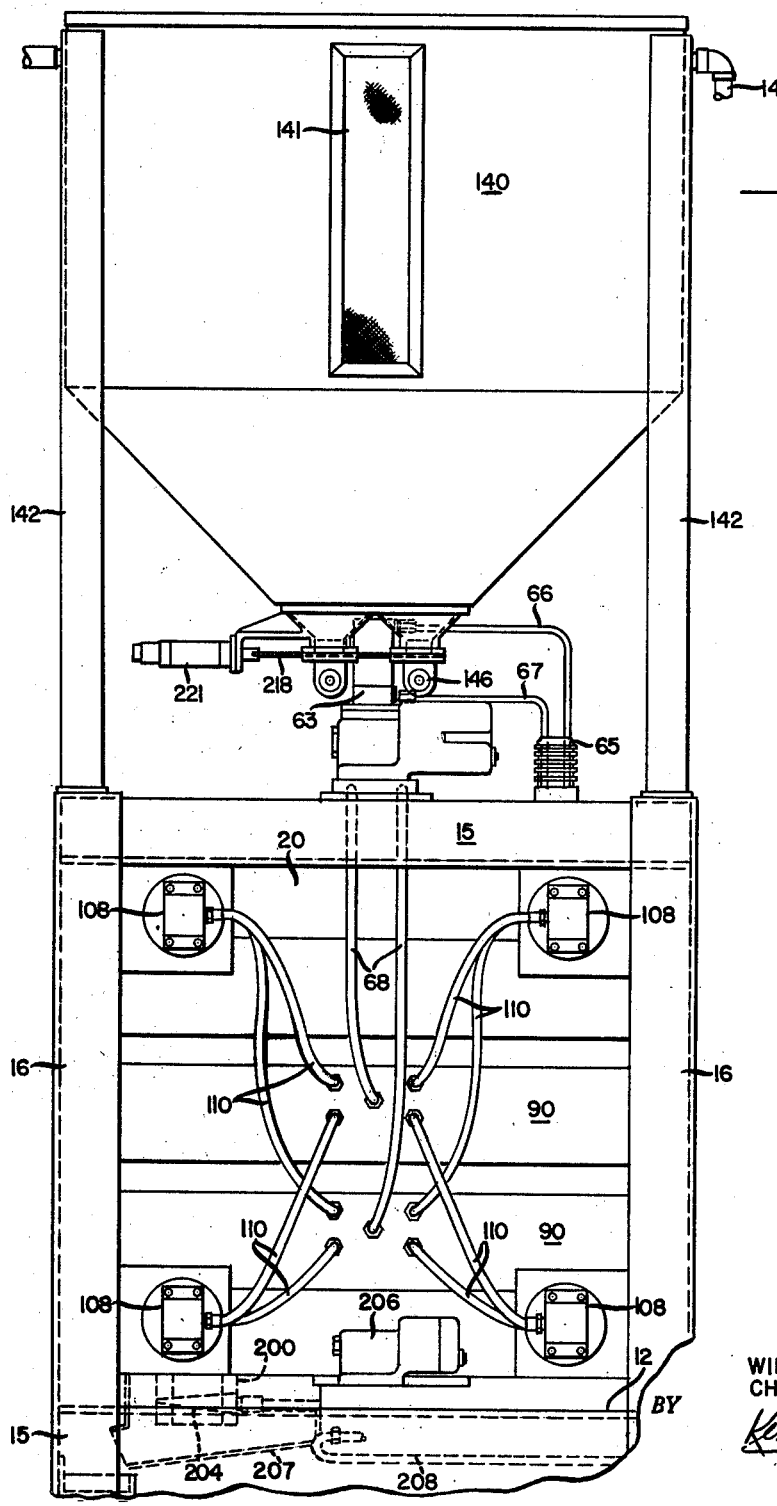
FIGS. 2 and 3 are fragmentary, enlarged, end elevational views of the apparatus as viewed from the left and right respectively of the structure shown in FIG. 1.

Vertical reciprocation of the runner element 62 is obtained by the action of a cylinder 63 disposed below the hopper 140 and controlled by a solenoid valve 65 linked thereto by control lines 66 and 67. Power to the cylinder 63 is provided by pneumatic lines 68 leading therefrom to the air tanks 90 (see FIG. 2).

After the material within the cavities has remained therewithin for such length of time as is necessary to elevate the temperature of the material to the level necessary to effect expansion and solidification, and after the material has then been cooled to a temperature as to preclude further and unwanted expansion thereof following removal from the press, the pressure within the pneumatic lines is reversed so as to retract the piston 122 of the main power ram 120 and to part the elements of the die member.

The water and steam supply systems will now be explained.

Figure 3:
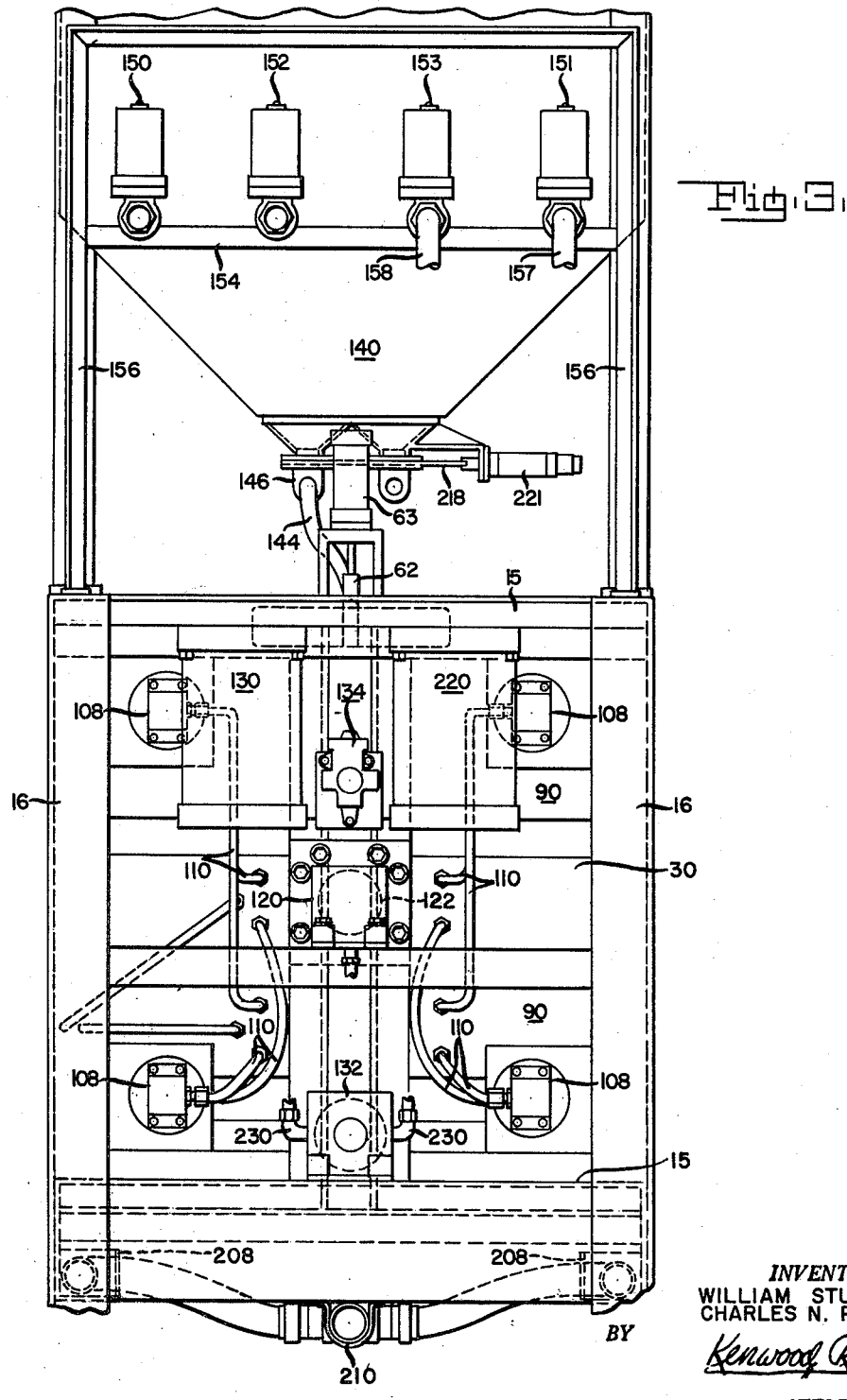

As shown in FIG. 3, appropriate water metering means in the form of valves 150 and 151 are disposed upon a valve support rack 154 located upwardly of the frame and supported by suitable uprights 156 projecting upwardly from said frame and cross members 154.

Valve 151 is connected by a pipe 157 for leading water to a single water inlet 159 located in the rear wall of the stationary head platen (as in FIG. 4) which in turn feeds the water to a water distribution system therewithin, subsequently to be referred to.

Valve 150 is connecetd by a flexible connection (not shown) to a single water inlet at the top of the movable head platen, which in turn feeds to the water distribution system therewithin.

Appropriate steam metering means in the form of valves 152 and 153 are disposed upon said rack 154.

Valve 153 is connected by a pipe 158 to a manifold 160 leading into the upper wall of the steam chest of the stationary head platen through suitable inlet couplings 162, as in FIG. 4, leading directly into the steam chest.

Valve 152 is connected by a flexible connection (not shown) to a manifold leading into the upper wall of the steam chest of the movable head platen through suitable inlet couplings, leading directly into the steam chest.

Suitable heating means (not shown) is provided as a source for the steam which is led to the said valves 152 and 153 and therefrom to the respective steam chests for the accomplishment of the heating requisite to expanding the molding material.

Presteaming and steaming are both contemplated herein although presteaming is not alway obligatory. Generally it will be used in the case of a mold where it is necessary to heat the mold before charging.

Both of the steam chests may be presteamed and steamed, or one chest alone may be presteamed, or one chest alone may be steamed, all as desired, such selectivity being permitted by the provision of individual controlling devices for regulating the presteam and steam cycles of each of the chests.

The water inlets 159 of each head platen are connected by means of an internal water connection 164 to a water distribution system provided within the double walled body of the respective ejector and spray plate.

Figure 7:
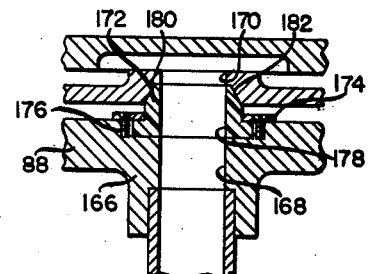
FIG. 7 is an enlarged sectional view of a water connection employed in each of the steam chests of the invention.
Figure 8:
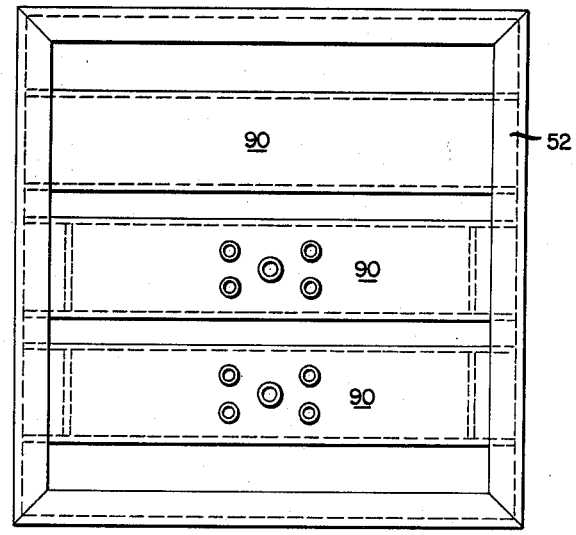
FIG. 8 is a rear elevational view of the stationary head platen of the invention.
Figure 9:
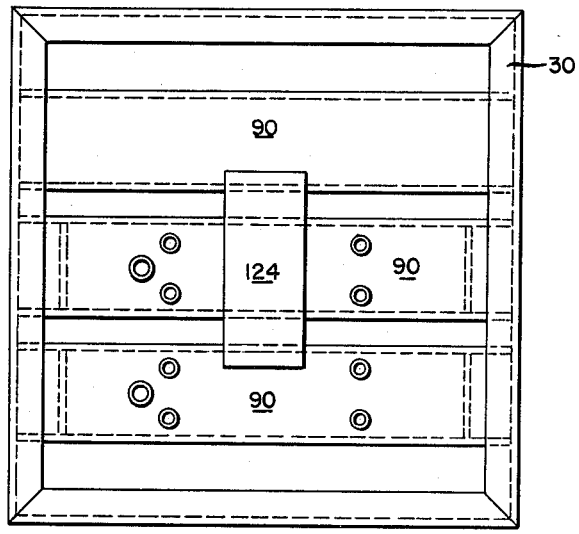
FIG. 9 is a rear elevational view of the movable head platen of the invention.

As best seen in FIG. 7, said internal water connection 164 is disposed centrally of the web wall 88 of the steam chest housing which is provided with a boss 166 of appropriate size to receive the extremity of the water inlet pipe 159. Said boss 166 is provided with an opening 168 therethrough, which opening communicates with an opening 170 provided in the rearward face of said ejector and spray plate.

A plug 172 is fixed to the forward face of web wall 88 by means of an annular ring 174 which overlies said plug and is fixed to said web wall as by circumferentially-arranged screws 176 or equivalent. Said plug is provided with a central opening 178 therethrough communicating with the opening 168 in the boss 166 and with the opening 170 in the ejector and spray plate.

Both plug 172 and opening 170 in the ejector and spray plate are provided with tapered seats 180 and 182 whereby a tight seal may be provided between the web wall and ejector and spray plate when said plate is in retracted position.

As seen in FIG. 4, the ejector and spray plates are provided with a plurality of internal waterways 190 leading from the internal water connection 164. These waterways may be disposed in any desired pattern, and their showing as being vertically disposed is for purposes of illustration only.

Spray nozzles 191 may be threaded in appropriate openings provided in the forward face of the ejector and spray plates, with said spray nozzles communicating with the aforementioned waterways 190.

The water connection communicates with the water passageways provided in the ejector and spray plates, with the vertically disposed waterways 190 being interconnected at their upper ends by a horizontally disposed waterway 192 emanating from the water connection, and being interconnected at their lower ends by a horizontally disposed waterway 194 leading to drains 200 fixed to the bottom walls of said head platens.

Water sprayed from the nozzles of the ejector and spray plates may be drained from the head platens by means of the drains 200, which are in the form of gate valves having a tapered channel 202 and a tapered gate 204 actuated by an air cylinder 206 at appropriate intervals during the molding cycle.

The drains feed into a channel 207 leading to troughs 208 which in turn lead to a take-off 210 provided within the frame.

Steam to both the stationary and movable platens is controlled by pressure switches 212 appropriately mounted on the frame or by other suitable means in the nature of temperature switches or the like. The pressure switches are of the well known mercury type and comprise the conventional bellows operating a linkage which trips a mercury switch from one position to another. As the pressure builds up in the steam chest, the pressure naturally builds up in the pressure sensing line, and when it reaches a predetermined point for which the pressure switch is set, the bellows, having expanded, moves the linkage and trips the switch so as to close the respective steam valves controlled by said pressure switches.

As shown in FIG. 1, a pressure switch 212 for the steam cycle and a pressure switch 213 for the pre-steam cycle are provided for each head platen.

The steam valves 152 and 153 remain in the opened position after having been actuated by appropriate electrical means at any appropriate or predetermined moment during the cycle, so long as the pressure switches 212 or 213 are not tripped by an increase in pressure within the respective steam chests.

As aforesaid, the use of a pre-steam step is optional and its use will be determined by the nature of the material being molded. Primarily, pre-steaming is used in the case of a mold where it is necessary or advisable to heat same before charging. When pre-steaming is employed, the mold cavity is not filled before the steam valve is opened. The steam valve is opened and the drain is closed so that a small amount of steam pressure may be built up in the mold in order to bring it to the desired temperature for the specific operation. The pre-steam pressure switch is tripped by the pressure built up within the steam chest, whereupon filling of the cavity begins. Following filling, the steam valve is opened once again and the drain closed again for the normal steaming cycle. At the termination of the steaming cycle, when the steam pressure switch trips, the steam is shut off and the water is started.

Whatever gases or compressible fluids are present in the chest (usually a mixture of steam and air) pass from the chest to the pressure switches through pressure sensing line 216 leading from the steam chests to the pressure switches 212 and 213.

Within either head platen, the steam and water may mix but not as a necessary part of the operation hereof. For instance, at the end of the steaming cycle there will naturally be steam present within the chest as the water spray cycle is initiated. Such steam may be vented out completely and could be swept out, if desired, by the use of air jets or the like before the spray of the water is commenced. As a matter of convenience and further as a matter of esthetics, because the spraying in of the water serves to "kill" the steam pressure before the drains are opened, there is a minimum steaming condition around the machine. Accordingly, in practice, the water spray is commenced while the steam pressure is still on. That is, when a pressure switch shuts the steam valve on either side, the spray water is then commenced, though the drains remain closed for an appreciable time as controlled by a time delay relay and until the pressure has dropped to approximately atmospheric pressure whereupon the drains open permitting the water to be removed.

As to the necessity for water cooling, let it be premised that such is requisite.

Without cooling, when the formed article is removed from the mold, accepting the suggestion ab initio that it might be possible so to remove an uncooled article from the mold, the formed article would continue to expand. Instead of merely expanding to the point of fusion and then cooling down to be removed from the mold and in the desired shape, it would continue to expand conceivably to a point where the surface of the article actually breaks.

Conversely, the apparatus could be allowed to cool without any water spray or cooling method whatever, that is, by allowing the natural fall of temperature by the passage of time to bring the article down to a cool enough state as to permit its withdrawal. Obviously, such a solution is unpractical where a high rate of production is a desideratum.

The steam is controlled by a pressure switch means now to be described and it will be observed that such means is an improvement over a simple timing arrangement where steam might be introduced into the steam chests for a measured time period and then shut off with the hope that the correct pressures and molding temperatures had been attained.

Said pressure switch controls the steam valve.

Once the steam valve is opened, it remains opened until closed again upon the trip of the pressure switch as effectuated by the increase of pressure in the steam chest.

Immediately below the supply hopper 140 and between said hopper and venturi 146, a sliding shut off or gate 218 is provided. At the close of the feeding period, said gate is moved to closed position by an air cylinder 221 attached thereto. The filling air is continued, however, and another blow of boost air is then applied through the boost air connection 148 shown in FIG. 12 so as to produce an increased pressure for blowing out. Simultaneously, another flow of boost air is directed to the bottom end of the runner through the connection 149 also shown in FIG. 12 and creates a venturi action similar to the venturi action produced adjacent the hopper. In effect, a push is produced at the top of the runner so as to push the beads out while a pulling action is produced at the bottom of the runner so as to pull the beads out, thus producing a double force to return the unused beads from the runner back to the hopper through the flexible tube 145, the returned beads being blown to the top of the hopper and discharged thereinto. They are blown to the top of the hopper so that the air which carries them thereto will not become entrapped in a mass of the material within the hopper and escapes through the screened opening which also serves (as aforesaid) as a viewer in the side wall of the hopper for determining the true supply situation within the hopper.

The molding time sequence is graphically portrayed in FIG. 15, and is supported by the following explanation:

(1) *Closing mold.*—This is an untimed motion during which the press closes until a limit switch is actuated to effectuate stoppage of the movable head platen with the opposed mold faces either held in kissing relationship or held distantly of each other a few thousandths of an inch so as to allow the escape of air during the subsequent filling operation.

(2) *Presteam (optional).*—This is an optional untimed motion during which steam may be introduced into the steam chests by means of the conduits leading thereto and with the drains being closed and continuous until the presteam pressure switch is actuated by the increase of pressure, so as to shut the steam valves and to open the drains. Such may be accomplished for both the stationary and movable chests, or for either chest alone, or as aforesaid, may be omitted entirely.

(3) *Feeding mold.*—This is a timed feeding movement. On the actuation of the feed timer, the mold runner is reciprocated into the charge position. The slide gate on the venturi feeder is actuated to allow material to be drawn from the supply hopper into the air stream within the conduits and blown into the mold. The feed air valve is opened providing the air to operate the venturi and the boost air valve is opened to assure that the material will be blown to the farthest point of the mold. This continues until the end of the preset time.

It may be here stated that, within the supply hopper, the beads are blown to the top of the hopper whereby the air which carries them up will not become entrapped in the mass of material in the bin.

(4) *Blow out mold feed runner.*—This is a timed movement. When the feed timer times out, the runner is returned to the non-feeding position and the slide gate of the venturi is deactivated (removed to close position by means of the air cylinder 221) so as to shut off the supply of raw material. By the action of the runner a blow of boost air is made to supply a venturi action in the form of a sucking action to suck the excess material out of the runner simultaneously as the feed air and boost air combine with a blowing action to blow the excess material out of the runner. This continues until the end of the preset time.

(5) *Steam to preset pressure.*—This is an untimed steaming motion. When the blowout timer times out, the feed air and boost air are shut off. The steam valves are thereupon opened and the drain valves are closed so as to permit steam pressure to build up in the steam chests until the preset pressure on the steaming pressure switch is reached.

(6) *Drain (closed during presteam and steam).*—That the drain is closed during presteaming and/or steaming is an obvious requisite.

(7) *Cooling.*—This is a timed motion. When the steaming pressure switch is actuated by the rising back pressure in the steam chests, a time delay relay and the cooling water timer are actuated. The cooling water timer opens the water valves and water starts to spray into the mold chests through the spray nozzles of the respective ejector and spray plates and against the back of the cavity. Simultaneously, the time delay relay closes the steam valves. The drains are held closed for a period determined by the setting of the time delay relay in order to permit the water being sprayed into the mold chest to take up the heat of the steam contained therein and thereby reduced the internal pressure to a very low value before the drains are opened. Water continues to be sprayed into the mold chest until the end of the preset cooling time on the cooling water timer.

(8) *Pressure or vacuum chest (one side optional)*

(9) *Ejection.*—When the cooling water timer times out, the press starts to open. If it is desired that the molded parts stay in contact with one mold face or the other for any reason, the drain on the other mold chest is now closed and air pressure is introduced into the chest so that the molded parts are forced away from that mold face by the action of the pressurized air escaping through the steam holes or vents in the mold face. The action of a limit switch reopens the drains and shuts off the air after the press has moved a short distance. When the mold faces are far enough apart so that the parts may be ejected from either side without sticking against the other side, a limit switch is actuated to energize a solenoid air valve which causes the ejector cylinders to push the ejector plates contained within the mold chests against the spring loaded ejector pins on the mold faces, causing them to forcibly push against the molded parts and remove them from the mold faces.

(10) *Opening mold.*—When the press reaches the end of its travel, another limit switch is actuated which causes the deactivation of the ejector air valve, the resetting of the feeding, blowout and cooling water timers, and the actuation of a preset recycling timer which restarts the action for the next cycle.

Suitable contacting, making and breaking devices are arranged at various parts of the machine to operate relays for the control of suitable time or otherwise controlled valves providing a proper sequence of operation of the various parts of the press with the proper timing, all as previously described.

The operation of the entire machine in a proper sequence is controlled by an electric circuit (not shown), same not forming a part of the invention.

It is believed that the gist of the invention will be clearly understood from the foregoing disclosure and accordingly, further analysis thereof at this point is considered unnecessary. We have, in accordance with the provisions of the patent statutes, described the construction and principle of operation of our invention together with the apparatus which we believe to represent the best embodiment thereof, to the end that others can, by applying current knowledge, readily adapt it for various applications without omitting features which, from the standpoint of prior art, fairly constitute essential characteristics of its generic and/or specific aspects.

The protection which is sought for this invention is covered by the language of the above specification and the spirit represented thereby and by the claim below which are desired to include within their scope all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claim.

We therefore particularly point out and distinctly claim as our invention:

In a molding apparatus for expansion-forming and shaping an article of expanded resin bead construction, the combination of, a supporting frame, a pair of separable head platens mounted relative to said frame and in alignment as to each other, a power means supported by said frame for reciprocating one of said head platens relative to said main frame and the other of said head platens between cavity-opened and cavity-closed positions in timed relation to the cyclical operation of the apparatus, a cooperating mold face associated with each said head platen, a cooperating steam chest associated with each said head platen and secured to and intermediate the respective said head platen and its respective said mold face, said mold faces being complementary and having confrontable and partible surfaces contacting each other in cavity-closed position and each being recessed to cooperatively define therebetween first an enclosed molding cavity and second an open-ended vertically-extending runner opening communicating with the molding cavity, each said mold face being provided with fluid apertures and ejection ports therethrough leading from the respective said steam chest to the molding cavity, an elongated vertically-reciprocable channel-shaped runner element embracing the recessed walls of the runner opening and being movable relative thereto between charging and non-charging positions, said runner element having a transversely-extending charging opening therethrough for registry with the molding cavity in the charging position of said runner element and non-registry with the molding cavity in the non-charging position of said runner element, a hopper on said frame for containing a supply of resin beads, valved pneumatic means for cyclically delivering a measured charge of resin beads from said hopper to the cavity via said runner element, cyclic means for selectively motivating said runner element vertically between charging and non-charging positions, supplemental pneumatic means for cyclically delivering excess beads from said runner element returnably to said hopper in response to the completion of the charging of the molding cavity, means operative in response to the completion of the charging of the molding cavity for charging steam to each said steam chest and therefrom to the molding cavity via the fluid apertures in the respective said mold face during the foam fusion portion of a forming cycle, a unitary valve-operated fluid spraying and spring loaded ejecting means being floatable within each said steam chest between a normal non-operational rearwardly-disposed position with the fluid spraying portion of said means being rendered non-operative and the ejecting portion of said means being retracted from extension into the molding cavity and an operational forwardly-disposed position with the fluid spraying portion of said means being rendered operative for the cyclic spraying of cooling fluid upon the rearward wall of the respective said mold face in response to the cyclic termination of the charging of steam into the molding cavity and the ejecting portion of said means being extended into the molding cavity unisonally through the ejection ports in the respective said mold face in response to the cyclic termination of the spraying of cooling fluid and the parting of the confronting surfaces of said mold faces, and means for guiding the floating movements of each said spraying and ejecting means within its respective said steam chest.

References Cited by the Examiner

UNITED STATES PATENTS

| | | | |
|---|---|---|---|
| 1,607,074 | 11/26 | Gros | 18—5 |
| 2,476,558 | 7/49 | Moxness | 18—30 |
| 2,779,062 | 1/57 | Stastny | 18—48 |
| 2,860,374 | 11/58 | Harrison et al. | 18—30 |
| 2,898,632 | 8/59 | Irwin et al. | 18—48 |
| 2,900,662 | 11/59 | Scherry | 18—5 |
| 2,951,260 | 9/60 | Harrison et al. | |
| 3,029,472 | 4/62 | Fischer | 18—30 |
| 3,066,353 | 12/62 | Marks et al. | 18—20 |
| 3,099,045 | 7/63 | Honkanen | 18—30 |
| 3,112,523 | 12/63 | Goulet et al. | 18—42 |

FOREIGN PATENTS 1,178,357  12/58  France.

OTHER REFERENCES

Plastics Engineering, pages 107–112 and 180–185, February 1961.

MICHAEL V. BRINDISI, *Primary Examiner.*

ROBERT F. WHITE, *Examiner.*